(12) United States Patent
Wachob

(10) Patent No.: US 10,197,450 B2
(45) Date of Patent: Feb. 5, 2019

(54) EMI-COMPATIBLE MECHANICAL TEMPERATURE THRESHOLD SENSOR

(71) Applicant: Rolls-Royce Corporation, Indianapolis, IN (US)

(72) Inventor: Timothy A. Wachob, Plainfield, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 1018 days.

(21) Appl. No.: 14/568,924

(22) Filed: Dec. 12, 2014

(65) Prior Publication Data

US 2015/0260585 A1    Sep. 17, 2015

Related U.S. Application Data

(60) Provisional application No. 61/919,522, filed on Dec. 20, 2013.

(51) Int. Cl.
| | |
|---|---|
| *G01K 5/00* | (2006.01) |
| *G01K 1/00* | (2006.01) |
| *G01K 9/00* | (2006.01) |
| *G01K 13/00* | (2006.01) |
| *G01K 5/44* | (2006.01) |
| *G01K 11/06* | (2006.01) |

(52) U.S. Cl.
CPC ............... *G01K 5/44* (2013.01); *G01K 11/06* (2013.01)

(58) Field of Classification Search
USPC .............. 374/195, 141, 187, 147, 201, 208; 116/218, 216
See application file for complete search history.

(56) References Cited

U.S. PATENT DOCUMENTS

| | | | |
|---|---|---|---|
| 748,931 A | 1/1904 | Conner | |
| 2,978,691 A * | 4/1961 | Beher | G01F 23/22 337/309 |
| 3,559,615 A | 2/1971 | Kliewer | |
| 3,680,385 A * | 8/1972 | Moran | G01K 5/42 374/195 |
| 3,682,130 A | 8/1972 | Jeffers | |
| 3,759,103 A | 9/1973 | Volk | |
| 3,915,006 A * | 10/1975 | Ayres | G01K 5/12 374/176 |
| 3,965,849 A | 6/1976 | Gee | |
| 4,034,698 A * | 7/1977 | Durand | G01K 5/20 116/216 |
| 4,083,250 A * | 4/1978 | Goff | G01K 3/00 116/101 |
| 4,102,200 A * | 7/1978 | Kelsch, Jr. | G01K 1/02 116/216 |
| 4,119,284 A | 10/1978 | Belmont | |
| 4,170,956 A | 10/1979 | Wear | |

(Continued)

*Primary Examiner* — Mirellys Jagan
(74) *Attorney, Agent, or Firm* — Fisherman Stewart PLLC

(57) ABSTRACT

A thermal sensor may include a housing having a thermal contact member, an indicator coupled to the housing, and a thermal sensing element disposed in the housing in thermal communication with the thermal contact member. The thermal sensor may also include an actuator element in communication with the indicator and thermal sensing element. The thermal sensing element may be configured to expand in response to reaching a temperature threshold thereby engaging the actuator element and activating the indicator.

19 Claims, 3 Drawing Sheets

(56) References Cited

U.S. PATENT DOCUMENTS

| | | | |
|---|---|---|---|
| 4,356,790 A | 11/1982 | Gee | |
| 4,421,053 A | 12/1983 | Volk | |
| 4,630,028 A * | 12/1986 | Kelly | G01K 3/00 |
| | | | 200/83 C |
| 4,633,213 A * | 12/1986 | Venema | G01K 5/42 |
| | | | 200/83 C |
| 4,947,786 A | 8/1990 | Maynard et al. | |
| 4,999,615 A * | 3/1991 | Toupin | F25D 29/008 |
| | | | 116/204 |
| 5,033,865 A | 7/1991 | Kuze | |
| 5,046,447 A | 9/1991 | Steinke et al. | |
| 5,323,730 A | 6/1994 | Ou-Yang | |
| 5,487,352 A | 1/1996 | Williams et al. | |
| 5,537,950 A | 7/1996 | Ou-Yang | |
| 5,799,606 A | 9/1998 | Volk et al. | |
| 5,988,102 A | 11/1999 | Volk et al. | |
| 6,257,758 B1 | 7/2001 | Culbertson | |
| 6,286,997 B1 | 9/2001 | Cunkelman et al. | |
| 6,305,313 B1 | 10/2001 | Cunkelman et al. | |
| 7,204,199 B2 | 4/2007 | Ribi et al. | |
| 8,263,017 B2 * | 9/2012 | Stewart | F03G 7/06 |
| | | | 116/218 |
| 2008/0144699 A1 | 6/2008 | Plevich et al. | |
| 2009/0175314 A1 | 7/2009 | Hollander | |
| 2010/0040112 A1* | 2/2010 | Huck | G01K 1/08 |
| | | | 374/183 |
| 2012/0201270 A1 | 8/2012 | Thompson | |

\* cited by examiner

EMI-COMPATIBLE MECHANICAL TEMPERATURE THRESHOLD SENSOR

CROSS-REFERENCE TO RELATED APPLICATIONS

This application claims priority to U.S. Provisional Patent Application No. 61/919,522, filed Dec. 20, 2013, the contents of which are hereby incorporated in their entirety.

GOVERNMENT RIGHTS

This invention was made with government support under F34601-03-D-0006 awarded by the United States Air Force. The government has certain rights in the invention.

FIELD OF TECHNOLOGY

The present disclosure relates generally to a mechanical temperature sensor, and more particularly to temperature indicator for providing a visual indication of whether a substance has exceeded a threshold temperature.

BACKGROUND

It has become increasingly desirable to improve the overall configuration and operation of temperature sensors used for indicating and detecting the presence of elevated temperatures. Temperature sensors may be designed for placement on the surface of an object, for example a temperature sensor utilizing irreversible temperature indicating paint that changes to a specific color upon sensing a predetermined surface temperature. Other temperature sensors may require electronic supporting control equipment for operation, such as sensors requiring an electrical measure device or voltage meter.

However, known temperature sensors are susceptible to electro-magnetic interference, incapable of reuse, and/or configured only to sense surface or fluid temperatures.

Accordingly, overcoming these concerns would be desirable and could save the industry substantial resources.

BRIEF DESCRIPTION OF THE DRAWINGS

While the claims are not limited to a specific illustration, an appreciation of the various aspects is best gained through a discussion of various examples thereof. Referring now to the drawings, exemplary illustrations are shown in detail. Although the drawings represent the illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrations are described in detail by referring to the drawings as follows:

DETAILED DESCRIPTION

Exemplary thermal sensors are described herein and illustrated in the attached drawings. While the thermal sensor may have various implementations, all may employ a phase-changing thermal sensing element configured to expand upon reaching a temperature threshold and thereby apply pressure to move an actuator element or open a valve. As such, the thermal sensor herein described utilizes mechanics, rather than electronics, and therefore is impervious to electro-magnetic interference (EMI).

The thermal sensor may be used for indicating and detecting elevated surface and fluid temperatures in various aircraft, ship, automotive, locomotive, and facility engines (e.g., gas turbine engine). For example, the thermal sensor may be positioned in an oil line or drain plug of the engine to gauge the operating temperature of oil being supplied to the engine. Similarly, the thermal sensor may abut an actuator, valve, housing, or other surface of the engine to detect and indicate elevated temperatures. Accordingly, it may be easier to perform maintenance and detect malfunctioning or failing components due to the deleterious effects high temperature may have on these components. However, although illustrative examples are described with respect to turbine engines, it is contemplated that the disclosure pertains to other components and/or designs, such as generators, power converters, transmissions, oil pressure pumps, etc.

Figure 1:
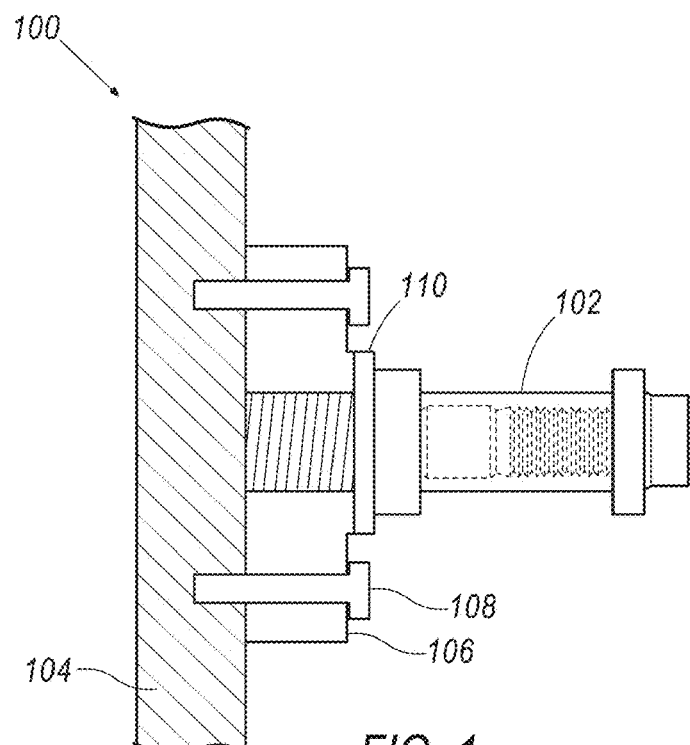
FIG. 1 illustrates a side view of a thermal sensor surface mounting configuration according to one example.

FIG. 1 illustrates a surface sensor mounting configuration 100 according to one implementation. A thermal sensor 102 mounted to a surface 104 according to one implementation. The thermal sensor 102 may include a contact member in thermal communication with the surface 104, for example a combustor housing, generator, rectifier, converter, etc. The thermal sensor 102 may be secured to the surface 104 via a mounting bracket 106 and fasteners 108. A high temperature gasket 110 may be placed between the thermal sensor 102 and mounting bracket 106 mating surfaces, forming a tight, thermally sensitive seal.

Figure 2:
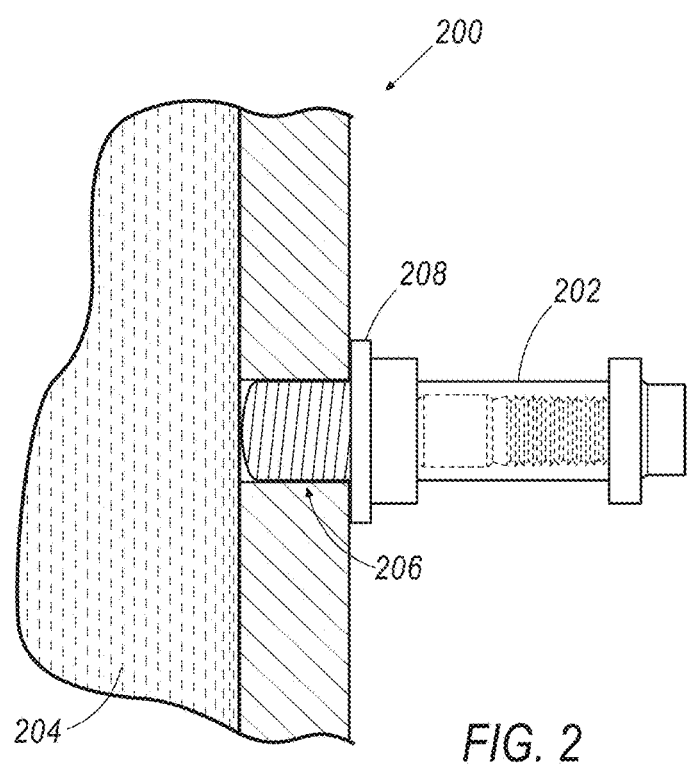
FIG. 2 illustrates a side view of a thermal sensor fluid mounting configuration according to one example.

FIG. 2 illustrates a fluid sensor mounting configuration 200 according to one example. A thermal sensor 202 is mounted to detect the temperature of a fluid 204. In one example, the thermal sensor 202 may be located in a bore of a cavity 206 such that a contact member may be in thermal communication with the fluid 204 to be measured. A high temperature gasket 208 may be disposed between the cavity and the thermal sensor mating surface to form a tight, thermally sensitive seal. Accordingly, the thermal sensor 102, 202 may be used for various applications for both surface and fluid detection of elevated temperatures.

Increased surface and/or fluid temperatures are detected and identified by the thermal sensor configured to activate an indicator at a predefined temperature threshold. That is, the thermal sensor may include a thermal sensing element calibrated to trigger upon reaching the temperature threshold, formed as a function of the actual surface or fluid temperature to be detected. If the thermal sensor, via the thermal sensing element, determines the surface or fluid temperature exceeds the threshold, an indicator is activated and remains activated until manual reset. The thermal sensor, therefore, is completely reusable and independent of an external energy source. In essence, the thermal sensor is entirely mechanical, thereby minimizing EMI interference with surrounding equipment.

Figure 3A:
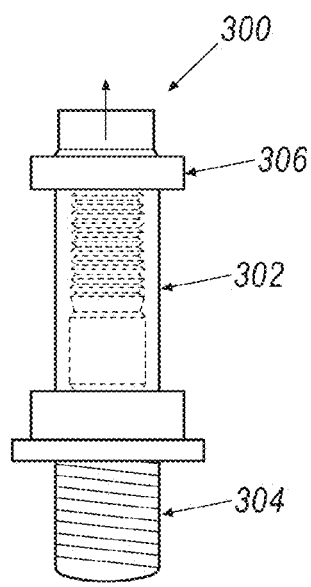
FIG. 3A illustrates a side view of a thermal sensor piston configuration according to one implementation.

Referring to FIG. 3A, an exemplary thermal sensor 300 according to one implementation is illustrated. The thermal sensor 300 may include a housing 302 having a thermal contact member 304 and an indicator 306 coupled thereto. The housing may comprise a high temperature plastic, such as Nylon or polyether ether ketone (PEEK), or may comprise a metal such as stainless steel. The thermal contact member 304 may comprise a metal, such as stainless steel, brass, copper, or any other metal configured to facilitate thermal conduction from the surface/fluid to be measured. The thermal contact member 304 may be configured as a threaded barrel, for example, having a generally flat bottom/base and a circumferential side surface.

The indicator 306 may be integrally formed with or coupled to the housing 302, and may be comprised of a high temperature plastic, such as nylon or PEEK. According to one example, the indicator 306 may be different in color to more easily distinguish from the housing 302. Additionally, the indicator 306 may be multi-colored to differentiate between activated and inactivated, thereby minimizing erroneous or false triggers that may lead to unnecessary replacement costs. For instance, the indicator 306 may include a bright colored stripe (e.g., red, orange, yellow) that may only be seen once the indicator 306 is actuated. The indicator 306 may resemble, for example, a button or the like configured to activate or extend in position relative to the housing 302 when actuated. The button indicator 306 may include protrusions (cf. FIG. 5B at 518) about its periphery such that when actuated, the indicator 306 remains in an activated or raised position until manually reset. Alternatively, the button indicator 306 may be threaded such that actuation causes the button to unravel to an activated state, thereby requiring manual twisting/screwing to reset the indicator 306.

Figure 3B:
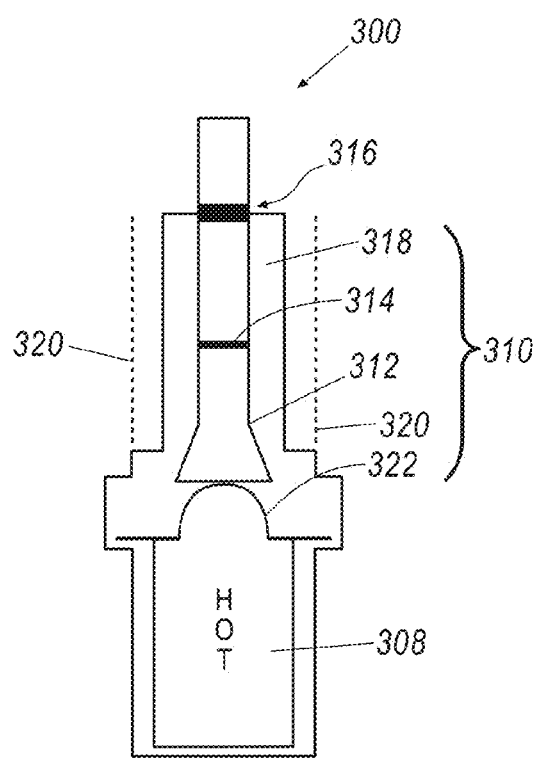
FIG. 3B illustrates a side cross-sectional view of a thermal sensor piston configuration according to another implementation.

FIG. 3B illustrates a cross-sectional view of the thermal sensor 300 according to the example of FIG. 3A. The thermal contact member 304 may generally house and be in thermal communication with a thermal sensing element 308. That is, the thermal contact member 304 may transfer heat from the surface/fluid to the thermal sensing element 308. Additionally, the thermal sensing element 308 may be disposed in a cup (not shown) configured to facilitate thermal conduction from the thermal contact member 304 to the thermal sensing element 308. The thermal sensing element 308 may generally be maintained within the thermal contact member 304 and/or cup via an expandable diaphragm 322. The thermal sensing element 308 may comprise a hydrocarbon composition or thermostatic fluid configured to expand upon reaching a threshold temperature. None limiting examples of the thermal sensing element 308 may include wax, alcohol, or any similar material configured to change phase (e.g., expand) at a given temperature. The thermal sensing element 308 may be calibrated to change phase and expand at a desired indication temperature, for instance, by adjusting the hydrocarbon composition/formulation to increase or decrease its tolerance to high or low temperatures. Accordingly, the thermal sensing element 308 may be configured to detect a broad range of temperatures based on the material composition.

The thermal sensing element 308 may be in communication with an actuator element 310. The actuator element 310 may be configured to actuate or otherwise activate the indicator 306 upon the expansion of the thermal sensing element 308. The actuator element 310 may comprise a unitary component, such as a single piston 316, or may comprise multiple components working in conjunction with one another. For example, the actuator element 310 may include a plug 312, a disk 314, and a piston 316. The plug 312 may comprise a high temperature conical rubber or plastic, whereas the disk 314 may form the junction between the plug 312 and the piston 316. The piston 316 may physically actuate the indicator 306 in the activated state and comprise a high temperature material, such as rubber, plastic, or metal (e.g., stainless steel). The plug 312, disk 314, and piston 316 may be arranged axially in a guide 318 such that actuator moves monotonically or unitarily back in forth within the housing 302.

The thermal sensor 300 may include a return member 320, such as a coil or spring. The return member 320 and thermal sensing element 308 may be calibrated such that the thermal sensing element 308 may overcome the resistance of the return member 320 during expansion in order to actuate the indicator 306. The return member 320 may be arranged axially around the actuator element 310 and/or guide 318, such that the actuator element 310 moves independently of the return member 320. The return member 320 may thus facilitate repositioning the thermal sensing element 308 to its initial position (e.g., its position when cool) by exerting a downward force on the thermal sensing element 308. The return member 320 may likewise exert a force on the indicator 306 to keep it in an activated or extended position.

According to another implementation, the return member 320 may be coupled to the actuator element 310 (e.g., coupled to the piston 316) and engage the indicator 306 with the requisite force so as not to falsely trigger the indicator 306 yet apply enough force to return the actuator element 310 to its initial position when the indicator 306 is reset after activation. That is, the return member 320 may not apply enough force to overcome the biasing force of the indicator 306 independently without the additional force applied from the actuator element 310 in response to the expansion of the thermal sensing element 308. Thus, the indicator 306 is only activated once the actuator element 310 engages the indicator 306 via expansion of the thermal sensing element 308.

During operation, the thermal sensor 300 detects and indicates elevated surface and/or fluid temperatures in an entirely mechanical process. When temperatures outside the thermal contact member 304 reach the calibrated temperature threshold of the thermal sensing element 308, the thermal sensing element 308 begins to expand within the thermal contact member 304 housing via the expandable diaphragm 322. This expansion consequently forces the actuator element 310 upwards, thereby engaging the indicator 306 and overcoming its biasing force to put the indicator 306 in an activated position. The thermal sensing element 308 contracts as the external temperature decreases, however the indicator 306 remains activated in a raised position due to the protrusions and/or return member 320. That is, the return member 320 may exert force on the indicator 306 to keep the indicator 306 activated, and/or may facilitate the repositioning of the thermal sensing element 308 as it contracts after cooling. Accordingly, the indicator 306 may not only indicate the threshold temperature has been detected, but may also act as a mechanism to manually reset the thermal sensor 300 during the next inspection performed by an operator. This, in turn, minimizes false or spurious indications of elevated temperatures as the indicator 306 remains activated until manually reset upon inspection.

To reset the thermal sensor 300, the return member 320 applies reciprocal force to return the actuator element 310 to its initial position when the indicator 306 is reset (e.g., pushing, screwing, or otherwise resetting the indicator 306). The actuator element 310 in turn forces the thermal sensing element 308 to fully return to its initial position so that the thermal sensor 300 is ready for reuse. As such, the disclosed thermal sensor 300 indicates elevated external temperatures in a purely mechanical series of actions, and is therefore impervious to EMI radiation which may affect surrounding equipment. Equally, the thermal sensor 300 does not require batteries or an external power source to function which may ultimately reduce costs and maintenance requirements.

Figure 4:
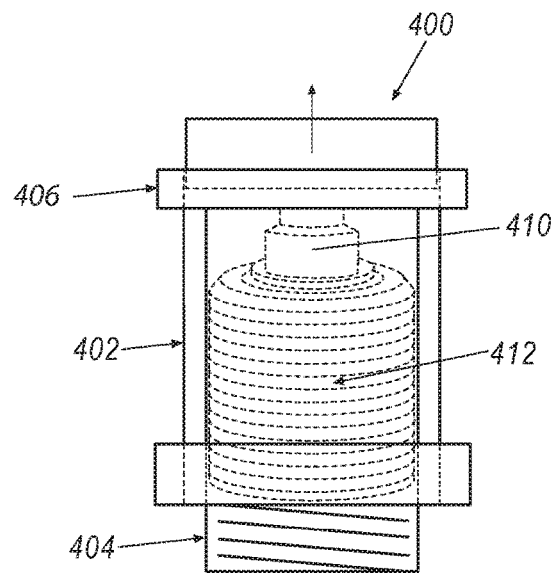
FIG. 4 illustrates a side view of a thermal sensor bellows configuration according to one example.

FIG. 4 illustrates a thermal sensor 400 according to another implementation. The thermal sensor 400 according to FIG. 4 may include many components similar to thermal sensor 300, including a housing 402, thermal contact member 404, indicator 406, thermal sensing element (not shown), and actuator element 410. Thermal sensor 400 may further include a bellows member 412 made of high temperature material disposed within the housing 402 configured to expand and contract along with the thermal sensing element. The thermal sensing element 308 may therefore be contained within the bellows member 412 and in thermal communication with the thermal contact member 404.

The bellows member 412, via the thermal sensing material, may be configured to actuate a further distance than generally necessary for the thermal sensor 300 according to FIG. 3. Therefore, thermal sensor 400 may provide more than an indication of whether a temperature threshold has been reached or otherwise triggered, but may also indicate the duration of excessive temperatures and/or peak temperatures depending on the thermal sensing element formulation. For instance, the thermal sensing element may be configured to continue to expand for the duration of measured high temperature, thereby actuating the indicator 406 beyond an initial indication. That is, the indicator 406 may be designed such that the more distant the indicator 406 is actuated signifies sustained high temperatures or different degrees of high temperature (e.g., the higher the temperature, the farther the indicator 406 extends). The indicator 406 may include incremental protrusions which may keep the indicator 406 activated in a variety of positions each of which is informative of measured external temperatures. For example, the indicator 406 may include a first stage of protrusions, a second stage of protrusions arranged more distant than the first stage relative to the housing, and so on, wherein each stage indicates at least one of temperature exceeding the threshold (e.g., stage one is the threshold temperature, stage two is the threshold temperature plus a defined degree Celsius) and/or a duration of extended high temperatures.

In operation, the thermal sensor 400 may proceed in the same manner as thermal sensor 300. For example, as temperatures outside the thermal contact member 404 reach a temperature threshold, the hydrocarbon thermal sensing element begins to expand within the bellows member 412. The actuator element 410, which may be attached to or formed with the bellows member 412, is forced upwards in the illustrated figure and engages the indicator 406 to activate the indicator 406. When the external temperature decreases, the thermal sensing element correspondingly contracts to its initial position, with the indicator 406 remaining activated until manual reset. The thermal sensor 400 may optionally have a return member 414 which may exert a force on the bellows member 412 to ensure the thermal sensing element is fully returned to its initial position upon manual reset of the indicator 406 (e.g., when indicator 406 is pushed downward for resetting the thermal sensor 400). Upon resetting the indicator 406, the process of operation returns to its original step and the thermal sensor 400 is therefore easily reusable for subsequent inspections.

Figures 5A, 5B:
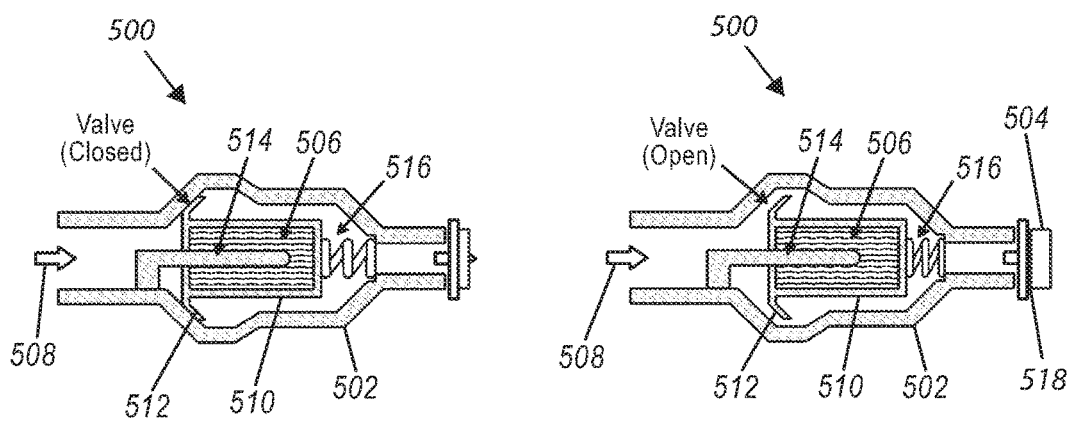
FIGS. 5A and 5B illustrate a side cross-sectional view of a thermal sensor valve configuration, with FIG. 5A showing the thermal sensor in a closed position and FIG. 5B showing the thermal sensor in an open position.

FIGS. 5A and 5B illustrate a thermal sensor 500 valve configuration according to another exemplary implementation, with FIG. 5A showing the thermal sensor 500 in a closed position and FIG. 5B showing the thermal sensor 500 in an open position. The thermal sensor 500 may be particularly advantageous to detect elevated fluid temperatures, as will be discussed below. The thermal sensor 500 may include a housing 502, an indicator 504, and a thermal sensing element 506 arranged within the housing 502. The housing 502, indicator 504, and thermal sensing element may generally resemble the materials and compositions detailed above. For example, the housing 502 may comprise a high temperature plastic or metal, and the indicator 504 may include protrusions 518 or may unravel when activated. The thermal sensor 500, however, may not have a thermal contact member, but rather may include an inlet or opening 508 at the base of the housing for fluid to enter and subsequently heat up the thermal sensing element 506.

The thermal sensing element 506 may be contained within a thermally conductive container 510, for example comprising a metal such as stainless steel, brass, or copper. The container 510 may include a projection 512 arranged about the perimeter. The projection 512 may extend circumferential or otherwise around the perimeter of the container 510 to form a seat and block the influx of fluid when the container 510 is in a closed position. Thus, the projection 512 of the container 510 may form the basis of the valve, blocking flow of fluid in a closed position and allowing the ingress of fluid in an open position.

The container 510 may include a bore which receives a support member 514. The support member 514 may be arranged concentrically supporting the thermal sensing element 506. That is, the support member 514 may be configured to maintain uniform and axial arrangement of the thermal sensing element 506 within the container 510. Additionally or alternatively, the support member 514 may provide support or act as an anchor for the thermal sensing element 506 to push off of as it expands when heated. For instance, the container 510 may include a deformable conical rubber plug (not shown) coupled to the end of the support member 514. As the thermal sensing element 506 heats up and expands, the thermal sensing element 506 may push off of the plug and support member 514 to move the valve in an open position. Thus, the container 510 translates to an open position whereas the support member 514 remains anchored at its designated position. Alternatively, the container 510 may include a high temperature deformable rubber seal (not shown), such as an O-ring, configured to act as a physical barrier to keep the thermal sensing element 506 from mixing with the high temperature fluid. Accordingly, as the thermal sensing element 506 expands within the container, the O-ring may deform allowing the thermal sensing element 506 to push off the support member 514 and move the container 510 into an open position.

The thermal sensor 500 may further include a return member 516 arranged within the housing 502 configured to reset the container 510 and thermal sensing element 506 to its initial closed position as the thermal sensing element 506 contracts due to decreased temperatures. The return member 516 may also act to prevent the valve from opening until the threshold temperature is reached. Accordingly, the return member 516 may be calibrated such that the expansion of the thermal sensing element 506 generates enough force to overcome the biasing force in the return element 516 allowing the valve to open and fluid to flood in through the inlet 508.

In the initial closed position, the projection 512 abuts a corresponding engagement surface on the inner surface of the housing 502 to form a closed valve position prohibiting the inflow of fluid into the housing 502. As fluid temperatures reach the thermal threshold, the thermal sensing element 506 begins to expand and physically push off of the support member 514. The force exerted on the support member 514 by the thermal sensing element 506 must be greater than the resistance of the return member 516 to create a gap between the projection 512 and the housing 502, thereby opening the valve. The subsequent inflow of fluid may build pressure within the housing 502 which acts on the indicator 504 and consequently activates in the indicator 504. The thermal sensing element 506 may begin to contract as fluid temperatures decrease, and the return member 516 may facilitate returning the container 510 to its initial closed position. Even after the container 510 returns to the closed position, the indicator 504 may remain activated until manual reset due to protrusions arranged about the periphery of the indicator 504.

Accordingly, the disclosed thermal sensor operates in a purely mechanical approach, and is thus impervious to EMI radiation and poses no risk of interfering with surrounding electronic equipment. The thermal sensing element, such as a hydrocarbon composition or other thermostatic fluid, may be formulated to expand at a desired temperature threshold and consequently actuate, via an actuating element, an indicator which remains activated until manually reset by an inspector. Therefore, the thermal sensor reduces false or spurious indications as the indicator is configured to remain tripped in the activated state until an external force is exerted on the indicator.

It will be appreciated that the aforementioned method and devices may be modified to have some components and steps removed, or may have additional components and steps added, all of which are deemed to be within the spirit of the present disclosure. Even though the present disclosure has been described in detail with reference to specific embodiments, it will be appreciated that the various modifications and changes can be made to these embodiments without departing from the scope of the present disclosure as set forth in the claims. The specification and the drawings are to be regarded as an illustrative thought instead of merely restrictive thought.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A thermal sensor, comprising:
    a housing having a thermal contact member,
    an indicator coupled to the housing;
    a thermal sensing element disposed in the housing in thermal communication with the thermal contact member; and
    an actuator element in communication with the indicator and the thermal sensing element, the actuator element movable to engage the indicator in an extended state and to decouple from the indicator in a retracted state;
    wherein the thermal sensing element is configured to expand in response to reaching a temperature threshold thereby engaging the actuator element and activating the indicator; and
    wherein the indicator includes protrusions configured to maintain the indicator in an activated state.

2. The thermal sensor of claim 1, wherein the thermal contact member contacts at least one of a surface and a fluid to be thermally measured.

3. The thermal sensor of claim 1, wherein the indicator is configured to remain activated until receiving an input resetting the indicator to an inactivated position.

4. The thermal sensor of claim 1, further comprising a return member in communication with the actuator element and the indicator, wherein the return member is configured to reset the actuator element in response to receiving an input on the indicator.

5. The thermal sensor of claim 1, further comprising a support member arranged concentrically in the thermal sensing element, wherein the support member is configured to maintain uniform and axial arrangement of the thermal sensing element in the housing.

6. The thermal sensor of claim 1, wherein the housing includes at least one of a high temperature plastic and a high temperature metal.

7. The thermal sensor of claim 1, further comprising an expandable diaphragm disposed between the thermal sensing element and the actuator element, the expandable diaphragm structured and arranged to maintain the thermal sensing element within the thermal contact member and expand with the thermal sensing element to engage the actuator element.

8. The thermal sensor of claim 1, wherein the actuator element includes a piston structured and arranged to actuate the indicator, and wherein the actuator element moves monotonically within the housing between the thermal sensing element and the indicator.

9. The thermal sensor of claim 1, wherein the thermal sensing element comprises a hydrocarbon material calibrated to expand at a predetermined temperature threshold.

10. The thermal sensor of claim 9, wherein the hydrocarbon material includes at least one of alcohol and wax.

11. The thermal sensor of claim 1, further comprising a bellows member disposed in the housing, wherein the bellows member contains the thermal sensing element.

12. The thermal sensor of claim 11, wherein the bellows member is configured to expand with the thermal sensing element, wherein expansion of the thermal sensing element engages the actuator element and activates the indicator.

13. A method of sensing a temperature, comprising:
    exposing a thermal contact member to at least one of a surface and a fluid, wherein the thermal contact member is in thermal communication with a thermal sensing element, the thermal sensing element expandable in response to a predetermined threshold temperature;
    actuating an indicator in response to reaching the predetermined threshold temperature, wherein expansion of the thermal sensing element forces an actuator element to engage the indicator in an activated position; and
    returning at least one of the thermal sensing element and the actuator element to an original position via a returning member, wherein the returning member has a resistance less than a reciprocal force of the thermal sensing element.

14. The method of claim 13, wherein the indicator remains extended in the activated position until manually reset.

15. The method of claim 13, wherein exposing the thermal contact member to at least one of the surface and the fluid includes at least one of mounting the thermal contact member to the surface via brackets and fasteners, and boring the thermal contact member into a cavity of the surface.

16. The method of claim 13, wherein the thermal sensing element comprises a hydrocarbon composition calibrated to expand at a threshold temperature.

17. A thermal sensor, comprising:
a housing having a thermal contact member;
an indicator coupled to the housing;
a thermal sensing element disposed in the housing in thermal communication with the thermal contact member;
an actuator element in communication with the indicator and the thermal sensing element;
a bellows member disposed in the housing, wherein the bellows member contains the thermal sensing element; and
wherein the thermal sensing element is configured to expand in response to reaching a temperature threshold thereby engaging the actuator element and activating the indicator.

18. The thermal sensor of claim 17, wherein the bellows member is configured to expand with the thermal sensing element, wherein expansion of the thermal sensing element engages the actuator element and activates the indicator.

19. The thermal sensor of claim 18, wherein the bellows member is attached to the actuator element, and wherein the bellows member via the thermal sensing element is configured to actuate the indicator into a plurality of activated states respectively corresponding to a different external temperature condition.

* * * * *